United States Patent
Gandhe et al.

(10) Patent No.: US 9,229,792 B1
(45) Date of Patent: Jan. 5, 2016

(54) METHOD AND APPARATUS FOR WEIGHTED MESSAGE PASSING

(75) Inventors: Maithili Gandhe, Austin, TX (US); Moinul H. Khan, San Diego, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 994 days.

(21) Appl. No.: 12/271,818

(22) Filed: Nov. 14, 2008

Related U.S. Application Data

(60) Provisional application No. 60/989,666, filed on Nov. 21, 2007.

(51) Int. Cl.
*H04W 80/04* (2009.01)
*G06F 9/54* (2006.01)
*H04N 21/462* (2011.01)

(52) U.S. Cl.
CPC ............ *G06F 9/546* (2013.01); *H04N 21/4622* (2013.01); *H04W 80/04* (2013.01)

(58) Field of Classification Search
CPC .... G06F 9/546; H04W 80/04; H04N 21/4622
See application file for complete search history.

(56) References Cited

U.S. PATENT DOCUMENTS

| | | | |
|---|---|---|---|
| 6,058,389 A * | 5/2000 | Chandra et al. ................ | 1/1 |
| 6,490,611 B1 * | 12/2002 | Shen et al. .................... | 718/103 |
| 6,714,554 B1 * | 3/2004 | Jin et al. ....................... | 370/412 |
| 6,934,287 B2 | 8/2005 | Okamura | |
| 7,230,923 B2 | 6/2007 | Onvural et al. | |
| 7,272,144 B2 | 9/2007 | Cloonan et al. | |
| 7,450,506 B2 | 11/2008 | Morikawa et al. | |
| 7,457,243 B2 | 11/2008 | Meggers et al. | |
| 7,657,672 B2 | 2/2010 | Kampmann et al. | |
| 7,710,962 B2 | 5/2010 | Kodama et al. | |
| 7,774,417 B2 | 8/2010 | Callanan et al. | |
| 7,813,367 B2 | 10/2010 | Davis et al. | |
| 7,877,514 B2 | 1/2011 | Shao et al. | |
| 8,077,601 B2 | 12/2011 | Maze et al. | |
| 8,265,091 B2 | 9/2012 | Firoiu et al. | |
| 8,306,060 B2 | 11/2012 | Ngo et al. | |
| 8,601,069 B1 | 12/2013 | Gandhe et al. | |
| 8,788,591 B2 | 7/2014 | Jiang et al. | |
| 9,055,019 B1 | 6/2015 | Gandhe et al. | |
| 2002/0150115 A1 * | 10/2002 | Onvural et al. ................ | 370/411 |
| 2003/0076848 A1 * | 4/2003 | Bremler-Barr et al. ........ | 370/412 |

(Continued)

OTHER PUBLICATIONS

IEEE Std 802.11e/D11.0, "IEEE Standard for Information technology—Telecommunications and information exchange between systems—Local and metropolitan area networks—Specific requirements, Part 11: Wireless Medium Access Control (MAC) and Physical Layer (PHY) Specifications: Amendment 7: Medium Access Control (MAC) Quality of Service (QoS) Enhancements," *The Institute of Electrical and Electronics Engineers, Inc.*, pp. 1-196 (Oct. 2004).

(Continued)

*Primary Examiner* — Charles E Anya

(57) ABSTRACT

A method and system for message passing which weights messages in a queue by urgency of consumption. A timestamp indicating the urgency of consumption may be assigned to a message, and messages may be automatically re-ordered based on their timestamps, following a first-in-weighted-out (FIWO) logic. Such a schedule-driven auto-reordered message passing system may provide increased efficiency, lower latency and is independent of the configuration of memory types.

17 Claims, 5 Drawing Sheets

(56) References Cited

U.S. PATENT DOCUMENTS

| | | |
|---|---|---|
| 2003/0112802 A1* | 6/2003 | Ono et al. .................. 370/389 |
| 2003/0202525 A1* | 10/2003 | Nagatomo ................ 370/411 |
| 2004/0001493 A1* | 1/2004 | Cloonan et al. ......... 370/395.42 |
| 2004/0160971 A1* | 8/2004 | Krause et al. .............. 370/412 |
| 2004/0170198 A1* | 9/2004 | Meggers et al. ............ 370/514 |
| 2004/0264485 A1* | 12/2004 | Okamura .................. 370/412 |
| 2005/0044151 A1* | 2/2005 | Jiang et al. ................ 709/206 |
| 2005/0091367 A1 | 4/2005 | Pyhalammi et al. |
| 2005/0124360 A1 | 6/2005 | Choi |
| 2005/0193421 A1 | 9/2005 | Cragun |
| 2005/0232155 A1* | 10/2005 | Morikawa et al. .......... 370/235 |
| 2005/0267941 A1 | 12/2005 | Addante et al. |
| 2006/0031358 A1 | 2/2006 | Canis |
| 2006/0036606 A1 | 2/2006 | Hildebrand et al. |
| 2006/0039393 A1* | 2/2006 | Firoiu et al. ................ 370/412 |
| 2006/0168080 A1 | 7/2006 | Surlaker et al. |
| 2006/0195538 A1 | 8/2006 | Miller et al. |
| 2006/0242669 A1* | 10/2006 | Wogsberg ................... 725/74 |
| 2006/0271645 A1 | 11/2006 | Theimer et al. |
| 2006/0277330 A1* | 12/2006 | Diepstraten et al. .......... 710/40 |
| 2007/0133531 A1* | 6/2007 | Kodama et al. ............. 370/390 |
| 2007/0156834 A1 | 7/2007 | Nikolov et al. |
| 2007/0180035 A1 | 8/2007 | Liu et al. |
| 2008/0133717 A1 | 6/2008 | Bouchat et al. |
| 2008/0215668 A1 | 9/2008 | Hu |
| 2008/0243675 A1 | 10/2008 | Parsons et al. |
| 2008/0250294 A1* | 10/2008 | Ngo et al. .................. 714/752 |
| 2008/0256272 A1* | 10/2008 | Kampmann et al. .......... 710/57 |
| 2008/0273554 A1* | 11/2008 | Shao et al. ................. 370/498 |
| 2009/0006546 A1 | 1/2009 | Blumrich et al. |
| 2009/0150977 A1 | 6/2009 | Carley |
| 2009/0219820 A1 | 9/2009 | Acke et al. |
| 2009/0252219 A1* | 10/2009 | Chen et al. ............... 375/240.02 |
| 2009/0307372 A1 | 12/2009 | Eller et al. |
| 2010/0040077 A1* | 2/2010 | Maze et al. ................ 370/412 |

OTHER PUBLICATIONS

IEEE P802.1AS/D0.8, "Draft Standard for Local and Metropolitan Area Networks—Timing and Synchronization for Time-Sensitive Applications in Bridged Local Area Networks," The Institute of Electrical and Electronics Engineers, Inc., pp. 1-149 (May 25, 2007).

\* cited by examiner

| 1 | V1 | TD1 | |
|---|----|-----|--|
| 0 | A3 | TD3 | |
| 0 | V2 | TD2 | |
| 0 | V4 | TD4 | |

METHOD AND APPARATUS FOR WEIGHTED MESSAGE PASSING

CROSS REFERENCE TO RELATED APPLICATION

This application claims the benefit of priority to previously filed U.S. provisional patent application Ser. No. 60/989,666, filed Nov. 21, 2007, entitled METHOD AND APPARATUS FOR SCHEDULE-DRIVEN AUTO-REORDERING MESSAGE PASSING SCHEME IN DEEPLY EMBEDDED PARALLEL MULTIMEDIA SYSTEMS. That provisional application is hereby incorporated by reference in its entirety.

This present application is related to the following U.S. Patent Application, which is assigned to the assignee hereof and incorporated herein by reference in its entirety: U.S. patent application Ser. No. 12/271,814, entitled METHOD AND SYSTEM FOR MESSAGE MULTICASTING, and filed concurrently herewith.

BACKGROUND

1. Field of the Invention

The present invention relates generally to message passing, and more particularly to message passing in multimedia systems.

2. Description of Related Art

The need for greater processing power in multimedia systems along with power consumption constraints has led to a new era of parallel computing or multi-core designs. One feature of parallel computer architecture is its inter-process communication (IPC). Message passing is one of the methods used for IPC. A prior art message passing system consists of FIFOs wherein the message buffers are written by one microprocessor (a "producer") and read by another microprocessor (a "consumer") respectively. FIGS. 1A and 1B illustrate a prior art message passing system consisting of a simple FIFO (First-In-First-Out). A message queue may have a start pointer and an end pointer, and the queue length therebetween is the message queue length. A write pointer and a read pointer are maintained and used to indicate a portion for previously read data, a portion for unread data, and a portion available for new data. When a producer writes a message to the queue, the write pointer is incremented, and when a consumer reads a message from the queue, the read pointer is incremented. FIG. 1A illustrates an un-wrapped state of operation wherein the write pointer is less than the read pointer, and FIG. 1B illustrates a wrapped state of operation in which the previously read data and the data to be written share the same portion.

In the system shown in FIGS. 1A and 1B, a message can be consumed by one consumer, since once a message is consumed, the read pointer in the FIFO increments, and the message is removed from the FIFO. To have a message from a producer be read by multiple consumers, the message has to be written in multiple queues, which considerably increases memory footprint. In addition, multiple FIFOs have to be read.

Another problem of the prior art system shown in FIGS. 1A and 1B is its inefficiency in system latency. The FIFO treats all messages the same way according to the first in first out logic. Since sub-computations involved in different applications in a multimedia system may have variable latencies, different incoming messages may consume varying amounts of time to process, thus leading to unpredictable response time. However, real time responsiveness is important in multimedia applications.

BRIEF DESCRIPTION OF THE DRAWING FIGURES

Embodiments of the present invention are described herein with reference to the accompanying drawings, similar reference numbers being used to indicate functionally similar elements.

FIG. 2B illustrates a sorter in a system for message passing according to one embodiment of the present invention.

DETAILED DESCRIPTION

The present invention provides a method and system for message passing which weights messages in a queue according to urgency of consumption. A timestamp indicating the urgency of consumption may be assigned to a message, and messages may be automatically re-ordered based on their timestamps, following a first-in-weighted-out (FIWO) logic. Such a schedule-driven auto-reordered message passing system may provide increased efficiency and lower latency, and is independent of the configuration of memory types. Advantages of the present invention will become apparent from the following detailed description.

A weight may be assigned to each message according to urgency of consumption. In one embodiment, the weight is a time stamp. One example of the time stamp is an early delay deadline (EDD) which may be included in the header of a message, e.g., by the producer of the message. The EDD may indicate when a message must be pulled out of the queue and consumed. For example, video and audio processing may have different real time bounds. In audio systems, a packet may represent a bigger scale in time. A loss or real-time miss of an audio packet may impact the user's experience more significantly than that of a video packet. Thus, packet throughput for audio is more time critical than that for video, and so audio messages may have a higher urgency of consumption, and may be assigned earlier EDDs.

Figure 2A:
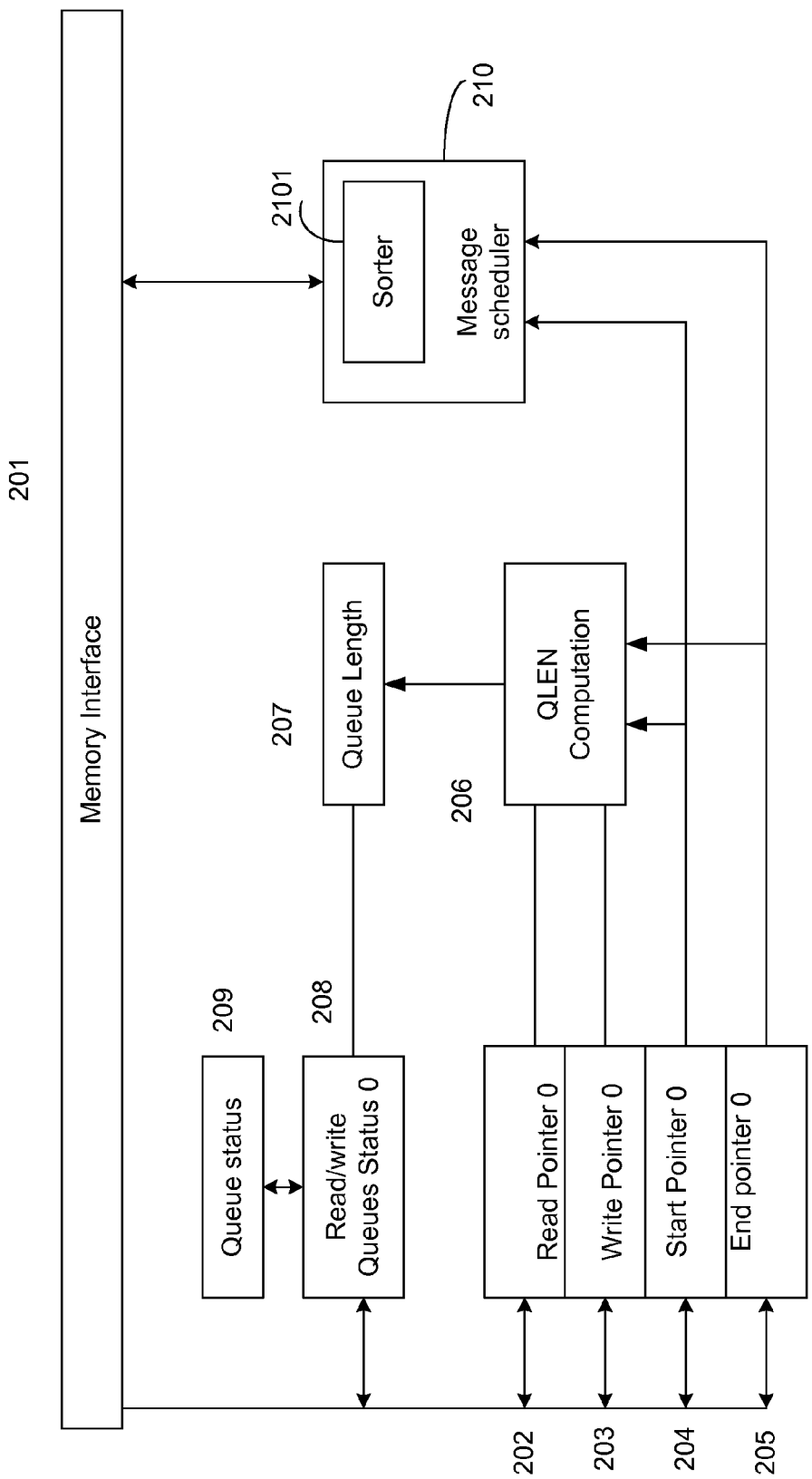
FIG. 2A illustrates a system for message passing according to one embodiment of the present invention.

FIG. 2A illustrates a system for message passing according to one embodiment of the present invention. A queue of messages may sit in a memory interface 201, which may be a random access memory (RAM) or a double data rate (DDR) memory. A start pointer 204 and an end pointer 205 may indicate the start and end of the queue respectively. A read pointer 202 may indicate the location of the message in the latest read operation, and a write pointer 203 may indicate the location of the message in the latest write operation. A pointer may be, e.g., a register. A QLEN computation module 206 may be coupled to a start pointer 204 and an end pointer 205, compute the queue length and forward it to the queue length module 207. The queue length module 207 may temporally store the queue length, and forward it to a Read/write Queues status module 208, which in turn is coupled to a queue status module 209. The Read/write Queue status module 208 may store information related to the read pointer 202 and the write pointer 203. The queue status module 209 may store the information about the queue, e.g., the queue length, the queue length of the data to be read and the available space for new data.

A message scheduler 210 may include scheduling logic implemented by hardware, firmware, or software and may be added to the message passing. It may interact with the pointers to get EDDs of the messages in the queue, and generate an order to access the messages according to their EDDs.

Figure 2B:
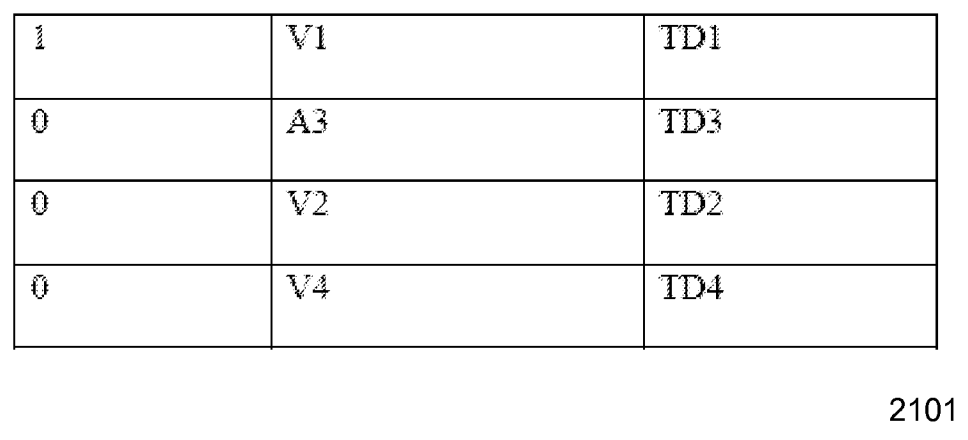

The message scheduler 210 may have a sorter 2101 that identifies, based on the EDDs, the next message which is to be executed. FIG. 2B illustrates a sorter in a message scheduler according to one embodiment of the present invention. The sorter may have a number of slots, each of which may be used for one message. EDDs (e.g., TD1, TD3, TD2 and TD4) of messages (e.g., V1, A3, V2 and V4) may be filled in the slots, wherein TD1 is the EDD of the message V1, TD3 is the EDD of the message A3, TD2 is the EDD of the message V2, and TD4 is the EDD of the message V4. The sorter 2101 may sort the EDDs, putting the least one first.

The message scheduler 210 may interact with the memory interface 201 on the other side to pull the actual messages according to the order in the sorter.

The sorter 2101 may have a pending bit in each slot, indicating whether the slot is available for the next EDD. When a message is pulled from the queue, its slot in the sorter may be set, indicating that it is empty and available. The pending bit of a slot may be at the beginning of the slot, as shown in FIG. 2B.

The message scheduler 210 may sort the EDDs either at receive time or at request time, and may use an absolute sorting mechanism. Alternatively, to reduce sorting hardware, the message scheduler 210 may only use a fraction of bits of the timestamp and generate the order based on a time interval. In one embodiment, the message scheduler 210 may use 8 bits for the timestamp and the last two bits may provide a granularity of 100 microseconds (µs). Accordingly, the message may tolerate a latency of 100 µs. If there is another message having an EDD of 50 µs, it may be processed earlier.

If a few messages are triggered ready at the same time, a persistency header may be used to get allowable targets. The persistency header is described in the co-pending U.S. patent application Ser. No. 12/271,814, entitled METHOD AND SYSTEM FOR MESSAGE MULTICASTING, which is incorporated herein by reference in its entirety.

Figure 3:
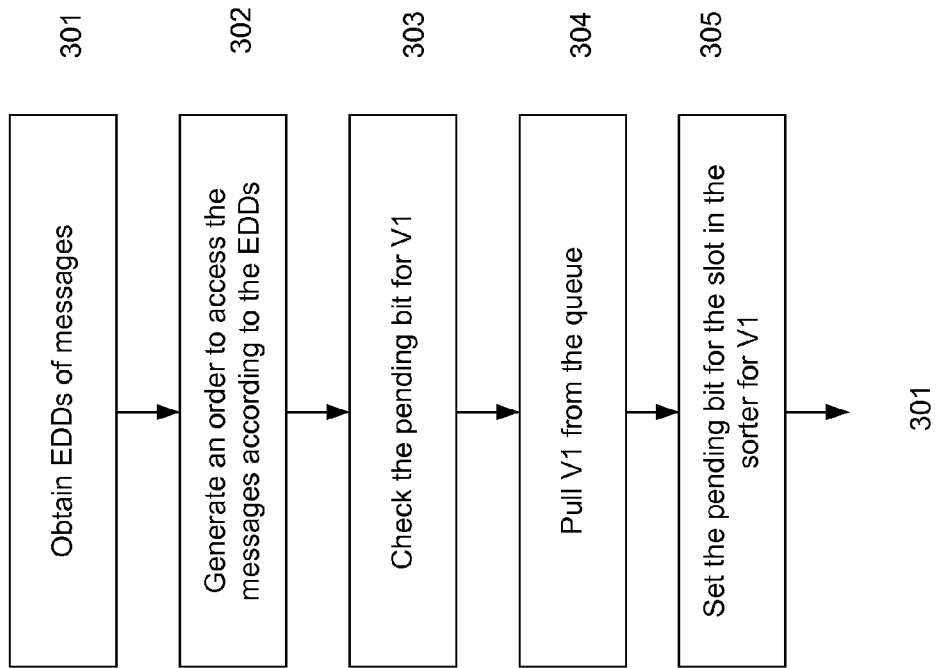
FIG. 3 is a flow chart of a method for message passing according to one embodiment of the present invention.

FIG. 3 is a flow chart of a method for message passing according to one embodiment of the present invention. The method may be used in the system shown in FIG. 2A, and may manage passing of messages in a queue, each of which has been assigned an EDD. As described above, the EDD may be assigned according to the urgency of consumption of the messages, e.g., an audio message may be assigned an earlier EDD than a video message.

Figure 4A:
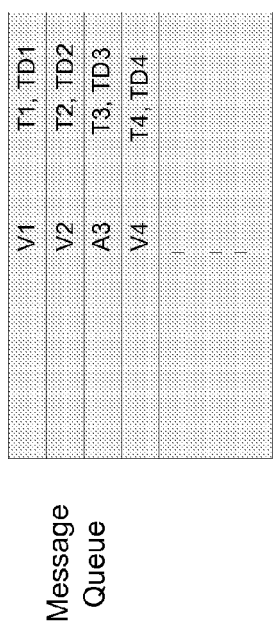
FIGS. 4A-4B illustrate message queues generated in a method for message passing according to one embodiment of the present invention.

FIG. 4A illustrates one example of the message queue. The message queue may contain video messages V1, V2, V4 and an audio message A3. The arrival times for the video messages are T1, T2, T4, and the EDD for the video messages are TD1, TD2, TD4. The audio message's arrival time is T3, and its EDD is TD3. The order of the messages is V1, V2, A3, and V4.

At 301, the message scheduler 210 may obtain EDDs of the messages from pointers 204 and 205, and put them in a sorter, e.g., 2101.

Figure 4B:
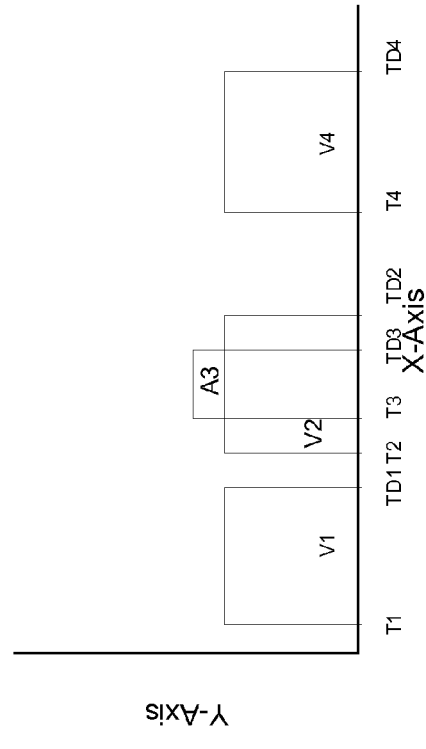

At 302, the message scheduler 210 may generate an order to pull the messages based on their EDDs. FIG. 4B illustrates a time sequence of messages in a queue according to one embodiment of the present invention. As shown, although the audio message A3 arrives later than the video message V2, A3's EDD, TD3, is earlier than V2's EDD, TD2. To avoid having the messages come out of order as when FIFO is used, the message scheduler 210 may generate an order to pull the messages according to a FIWO (First-In-Weighted-Out) logic. In one embodiment, the sorter may sort the EDDs, putting the least one first. Since A3 has an earlier EDD, the order to pull the messages may be changed to V1, A3, V2, and V4, moving A3 ahead of V2, as shown in FIG. 2B.

At 303, the message scheduler 210 may check the pending bit in each slot in the sorter, ignoring those which have been set. It should be understood that 303 may be performed before 302.

At 304, the message scheduler 210 may pull the actual message with the least EDD in the sorter from the memory interface 201. Since V1 has the least EDD, V1 may be pulled from the queue.

At 305, a pending bit may be set in the sorter for a message which has been consumed. Since V1 has been consumed, the pending bit of its slot in the sorter may be set, as shown in FIG. 2B. The next message may get the first empty slot.

The process may return to 301, and the EDD of the next message may be filled in the first empty slot in the sorter.

Thus, the message scheduler 210, or its sorter, does not move messages around. Instead, it looks at EDDs and pending bits for every slot, and determines which message should be pulled next and then pull the message. The message pass scheme shown in FIG. 2 is not a queue in which messages get shifted down, but a buffer with valid data and invalid data, and messages may be pulled out according to the valid data.

One advantage of the system shown in FIG. 2A is that, in contrast to a FIFO, the messages in the queue are not removed or collapsed, and may be accessed by another consumer. As a result, it is not necessary to write a message in multiple queues solely for the purpose of being accessed by multiple consumers, and memory footprints may be significantly reduced.

Figure 1B:
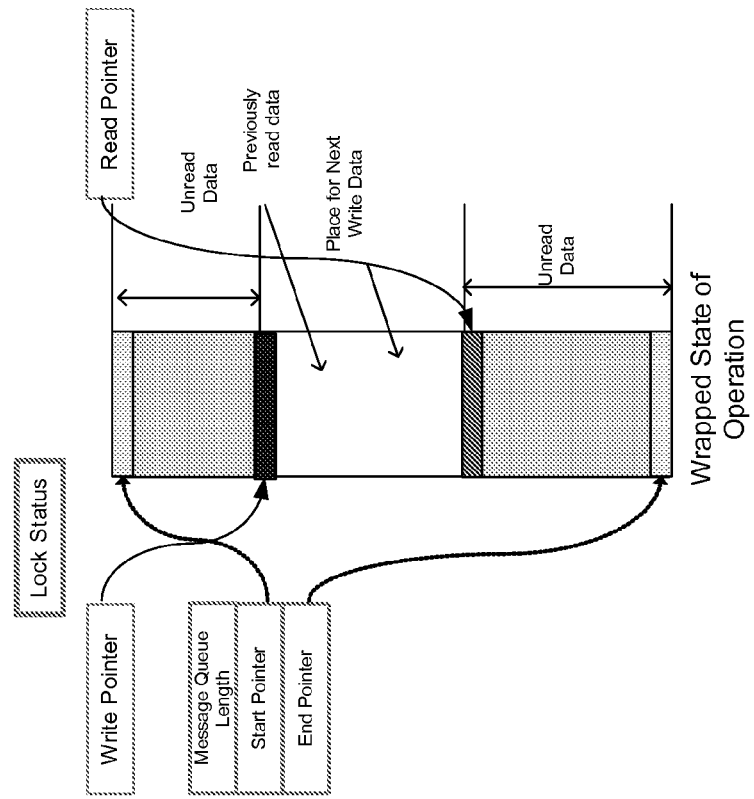
FIGS. 1A and 1B illustrate a prior art system for message passing.
Figure 1A:
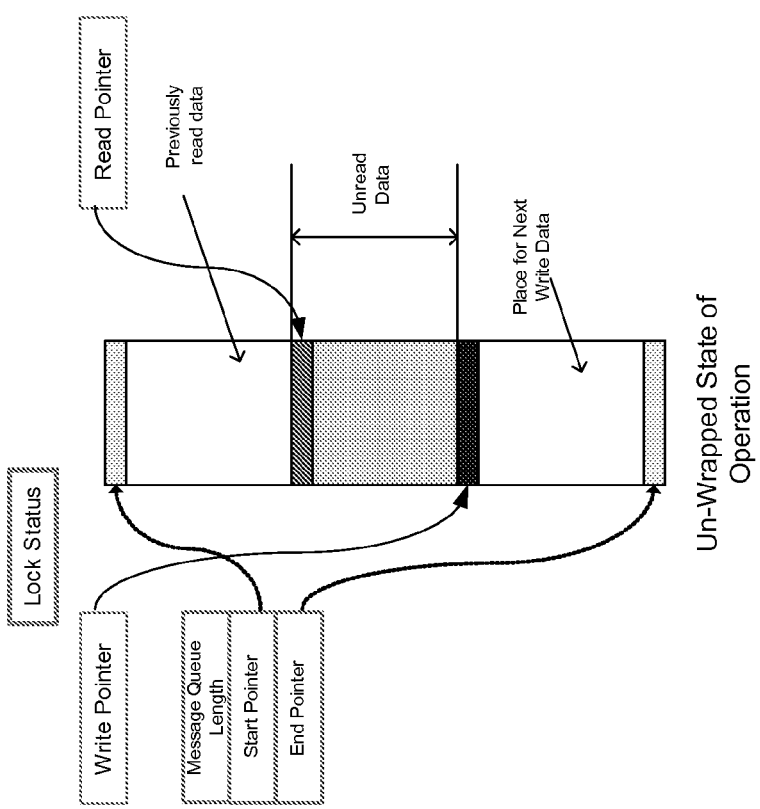

Another advantage of the system shown in FIG. 2A is that it may reduce inefficiencies in system latency. Different applications, e.g., audio and video, may have different latencies. The prior art system shown in FIG. 1 follows a simple FIFO logic and might not pass an audio message, which has a higher urgency of consumption, early enough and may impact end results. The system shown in FIG. 2A passes messages according to their urgency of consumption and consequently may improve user experience significantly.

Another advantage of the system shown in FIG. 2A is that it may reduce memory traffic. In the system shown in FIG. 1, when there are a number of messages sitting in a message queue, a consumer looking to consume the messages may have to continuously pull to see which is the next message it wants to consume. This causes a lot of memory traffic. Since the message scheduler 210 in FIG. 2A sorts access to the messages according to their urgency of consumption, consumers do not have to pull the queue. This may significantly reduce the memory traffic in the system.

Several features and aspects of the present invention have been illustrated and described in detail with reference to particular embodiments by way of example only, and not by way of limitation. Alternative implementations and various modifications to the disclosed embodiments are within the scope and contemplation of the present disclosure. Therefore, it is intended that the invention be considered as limited only by the scope of the appended claims.

What is claimed is:

1. An apparatus comprising:
a hardware memory device configured to store a message queue storing at least i) a first message having a first weight indicating a first transmission priority assigned by a first device that produced the first message and ii) a second message having a second weight indicating a second transmission priority assigned by the first device, or a second device, that produced the second message, wherein the hardware memory device is configured to store the first message and the second message in the message queue in a first order in which the first message and the second message are received; and
a message scheduler having a plurality of slots, the message scheduler separate from the hardware memory device and configured to obtain the first weight and the second weight, wherein the first weight is different from the second weight, use the first weight and the second weight, store information corresponding to the first message in a first slot among the plurality of slots and store information corresponding to the second message in a second slot among the plurality of slots such that an order of the first slot and the second slot in the plurality of slots indicates a second order to retrieve the first message and the second message from the message queue, and
determine whether a first pending bit for the first message has not been set,
determine whether a second pending bit for the second message has not been set,
when the message scheduler determines that the first pending bit has not been set and determines that the second pending bit has not been set, retrieve the first message and the second message from the message queue according to the second order indicated by the order of the first slot and the second slot in the plurality of slots of the message scheduler separate from the hardware memory device.

2. The apparatus of claim 1, wherein the message scheduler indicates that the first slot and the second slot are available as the first message and the second message are retrieved.

3. The apparatus of claim 1, wherein the message scheduler sets the first pending bit for the first slot corresponding to the first message after the first message has been retrieved from the message queue, wherein the first pending bit, as set, indicates that the first slot corresponding to the first message is empty.

4. The apparatus of claim 3, wherein the message scheduler fills a first empty slot in the plurality of slots with a weight of a third message.

5. The apparatus of claim 1, wherein the first weight and the second weight are respective time stamps.

6. The apparatus of claim 5, wherein the respective time stamps are respective early delay deadlines.

7. The apparatus of claim 6, wherein the first weight corresponds to an early delay deadline of an audio packet and the second weight corresponds to an early delay deadline of a video packet.

8. The apparatus of claim 1, further comprising a read pointer that indicates a location of the latest read operation in the message queue and a write pointer that indicates a location of the latest write operation in the message queue.

9. A method comprising:
storing in a message queue at least i) a first message having a first weight indicating a first transmission priority assigned by a first device that produced the first message and ii) a second message having a second weight indicating a second transmission priority assigned by the first device, or a second device, that produced the second message, wherein the first message and the second message are stored in the message queue in a first order in which the first message and the second message are received;
obtaining the first weight and the second weight, wherein the first weight is different from the second weight;
using the first weight and the second weight to store information corresponding to the first message in a first slot among a plurality of slots of a message scheduler separate from the message queue and to store information corresponding to the second message in a second slot among the plurality of slots such that an order of the first slot and the second slot in the plurality of slots indicates a second order to retrieve the first message and the second message from the message queue; and
determining whether a first pending bit for the first message has not been set,
determining whether a second pending bit for the second message has not been set,
when the message scheduler determines that the first pending bit has not been set and determines that the second pending bit has not been set, retrieving the first message and the second message from the message queue according to the second order indicated by the order of the first slot and the second slot in the plurality of slots of the message scheduler separate from the message queue.

10. The method of claim 9, further comprising indicating that the first slot and the second slot are available as the first message and the second message are retrieved.

11. The method of claim 10, further comprising:
setting the first pending bit for the first slot corresponding to the first message after the first message has been retrieved from the message queue, wherein the first pending bit, as set, indicates that the first slot corresponding to the first message is empty.

12. The method of claim 11, further comprising: filling a first empty slot in the plurality of slots with a weight of a third message in the message queue.

13. The method of claim 9, wherein the first weight and the second weight are respective time stamps.

14. The method of claim 13, wherein the respective time stamps are respective early delay deadlines.

15. The method of claim 14, wherein the first message is an audio message and the second message is a video message, and wherein the first message is assigned an earlier early delay deadline than the second message.

16. The method of claim 9, wherein the first message and the second message remain in the message queue after they are retrieved.

17. The method of claim 16, further comprising retrieving the first message a second time.

* * * * *